May 31, 1960

A. BUCHI

2,938,506

RECIPROCATING PISTON ENGINE TYPE GAS
GENERATOR FOR GAS TURBINES

Original Filed Feb. 18, 1948

Alfred BUCHI
INVENTOR

By:
Wenderoth, Lind & Ponack
Attys

RECIPROCATING PISTON ENGINE TYPE GAS GENERATOR FOR GAS TURBINES

Alfred Buchi, Winterthur, Switzerland; Dr. Hermann Walder, executor of the said Alfred Buchi, deceased Application July 23, 1953, Ser. No. 369,848, which is a division of application Ser. No. 9,284, Feb. 18, 1948. Divided and this application Apr. 21, 1958, Ser. No. 729,731

Claims priority, application Switzerland Feb. 19, 1947

18 Claims. (Cl. 123—52)

This application is a division of my co-pending application Serial No. 369,848, filed July 23,1953, in turn a division of 9,284, filed February 18, 1948, both now abandoned.

The invention relates to gas generators in the form of supercharged four-cycle reciprocating piston types of internal combustion engines feeding a pressure medium to a gas turbine delivering useful work. It consists specifically in a novel way of equipping the piston engine, on one hand, with charging medium pumps acting simultaneously as crosshead guides, for delivering charging air during the inlet period of the internal combustion engine, and on the other hand with piston pumps driven by the engine crankshaft which compress air beyond the pressure of the charging air, so that additional (secondary) air of higher pressure is fed via the internal combustion engine mainly during its exhaust period and through to the gas turbine. The charging air pump may be built single-acting or double-acting. In the latter case the lower side of the piston may act as a differential piston to permit the inner piston guide of smaller diameter to serve as crosshead guide. The engine-crankshaft-driven pump for the secondary air may be built as a double-acting air pump with at least two cylinders arranged in tandem, having approximately the same structural height as the internal combustion engine, with correspondingly short piston stroke. The secondary air pump may be driven from the extension of the engine crankshaft, i.e. on one or both ends of the latter.

The arrangement may be so that the cranks of the secondary pump cylinders are set out of phase to the cranks of the corresponding internal combustion engine cylinders, operating regarded to the latter. This is done preferably so, with corresponding timing of exhaust and air controlling gear, that first during an appreciable part of the exhaust periods of the engine cylinders only uncooled, hot exhaust gases flow from the engine cylinders to the gas turbine, and the cooler secondary air is introduced subsequently, first as cooling air, afterward as scavenging air during the period near the upper dead center position of the engine piston, for sweeping out the combustion gases from the engine cylinder. Subsequently, a further deliberate temperature reduction of the cylinder contents is accomplished through their expansion to the charging air pressure level prior to the actual admission stroke of the engine cylinders.

The internal combustion engine delivering the pressure medium may be fitted with multiple cylinder banks arranged side-by-side, and have double-acting piston compressors delivering secondary air drivingly connected on one or both ends of each cylinder bank, whereby the cylinders of said piston compressors may be grouped vertically in tandem. Furthermore, the crankshafts of the cylinder banks with internal combustion cylinders and compressor cylinders may be so coupled by means of gear wheels that the irregularities of torque and inertia forces and moments in the cylinder banks largely compensate each other. Suitable intermediary gear wheels may be so arranged between the crankshafts that the crankshafts of two adjacent cylinder banks have opposite sense of rotation and that the cranks of those internal combustion cylinders which are located in about the same transverse plane to the crankshaft are so set that said cylinders have simultaneous timing of their respective work phases (compression, combustion, expansion, etc.). Thus, the crosshead pressures acting transversely to the piston axis compensate each other with regard to the engine frame.

According to this invention, at least two cylinder banks drivingly connected with charging air pumps may also be arranged in V-form, and all the cylinders may drive a common crankshaft by means of connecting rods.

The charging air pumps which are driven by the combustion engine cylinders may deliver the charging air to at least one receiver arranged between said pumps and the engine cylinders and the charging air may be arranged to flow from said receiver or receivers to at least part of the engine inlet devices by common ducting.

At least one receiver for the secondary air may be located alongside the internal combustion cylinders. Between the receivers for the charging air and for the secondary air, suitable controlling means may be arranged which direct the charging air as well as the secondary air to the inlet devices or at least one engine cylinder at the proper time. For the control of the charging air as well as of the secondary air there may be arranged at least one similar common device each for two engine cylinders located adjacently in a transverse plane to the engine axis. Piston type sleeve valves, for instance, may serve as controlling means for charging and secondary air. They may be guided by means of two coaxial guide surfaces of different diameters in such a manner that despite the different pressure levels of charging air and secondary air there is approximate compensation of all pressures acting on said piston valve, with respect to the controlling forces for said piston valve.

In case of combustion engine cylinder banks arranged side-by-side, the admission of the charging air and of the secondary air may be effected by common ducts arranged between the banks, whereas the discharge of exhaust gases is effected by pipes arranged separately on the outside of the engine cylinder banks leading to the gas turbine. The charging air as well as the secondary air may, however, also be admitted from the outside of the engine cylinder banks, whereas the exhaust gases of the engine cylinders leave the latter through at least one exhaust manifold which is common for the cylinder banks and arranged between said banks in the middle of the engine. The exhaust pipes for the various engine cylinders may be combined in groups which are led separately to at least one turbine or to one turbine sector each so that the exhaust periods of any cylinders cannot disturb the exhaust periods and scavenging action in any other cylinders. The embodiment according to this invention has the advantage of making a very compact and simple piston type combustion gas generator for gas turbines. A large part of the cylinder output is transmitted directly to the charging air pumps and to the other engine cylinders and the secondary air pumps. The piping for the charging and secondary air to the engine cylinders is very short, and its control very simple. The control forces for these air guiding devices are small, and the control devices may be built in form of piston sleeves. The secondary air pumps may be built as double-acting tandem pumps of low structural height, with short piston strokes and thus with low piston speeds and low air speeds.

The various engine cylinder banks may be so coupled to each other that the crosshead pressures of these banks compensate each other with respect to the engine frame. The cranks of the cylinder banks may be so set that the moments of cylinder and inertia forces compensate each other.

The admission of secondary air to the engine cylinders may be arranged so that during a substantial part of the exhaust period first only hot, uncooled combustion gases are transmitted to the gas turbine. Subsequently, secondary air may be introduced, as cooling air during the exhaust stroke and as scavenging air around the time of the outer dead center position of the respective engine piston. This scavenging air admission may be followed by an expansion of the engine cylinder charge to the lower pressure level of the charging air, with corresponding further temperature reduction of said charge. The secondary air pumps may be so coupled against the internal combustion engine that maximum air delivery to the engine cylinders is accomplished.

The engine cylinders may discharge their exhaust gases to one or more gas turbines. The respective exhaust gas conduits may be subdivided into groups. The internal combustion engine may be so built that it drives directly at least part of its auxiliaries, such as fuel pumps, cooling water pumps, etc.

The object of this invention and its functioning is illustrated in various examples in 10 figures on 7 sheets. Same numbers or letters mean the same or similar parts or conditions.

Figs. 6 and 7 show top views of complete gas generator plants arranged together with the gas turbine or turbines which deliver the useful work. Fig. 6 refers to a gas turbine driving an electrical generator. Fig. 7 refers particularly to a power plant for locomotive drive, where two gas turbines drive through gears.

Figure 1:
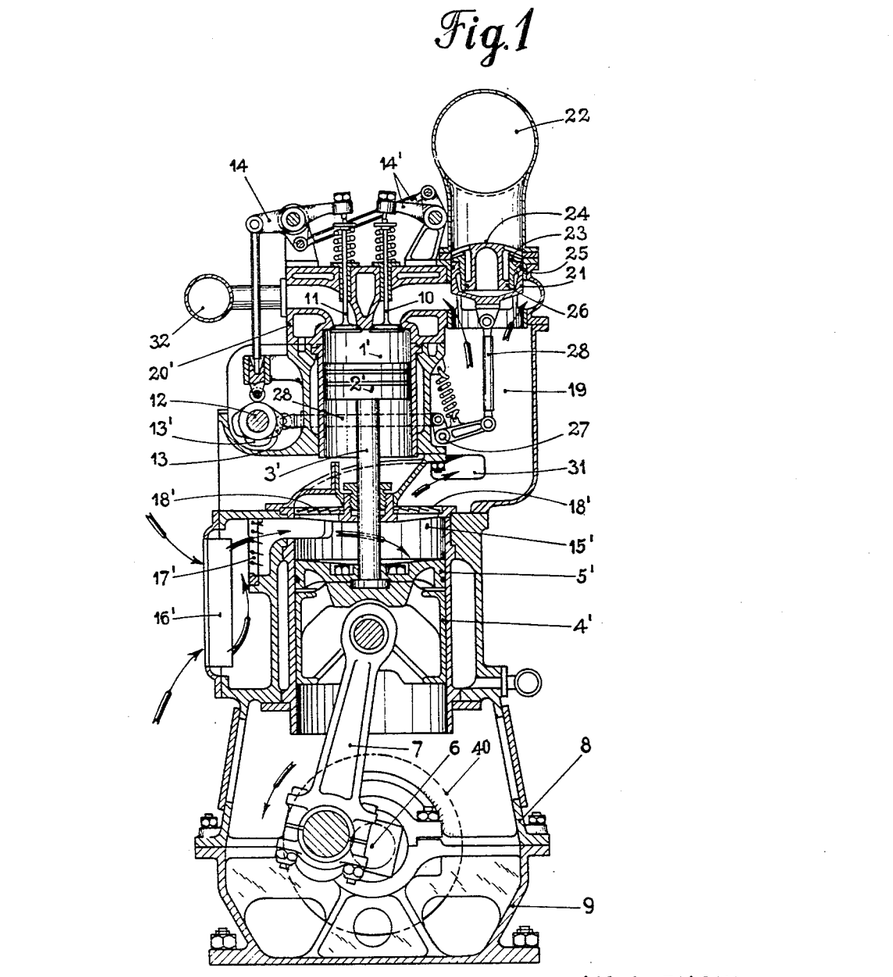
Fig. 1 shows a vertical transverse section through one cylinder of an in-line type of internal combustion engine with one crankshaft working according to the invention.

In Fig. 1, 1' is a cylinder of a four-cycle internal combustion engine acting as gas generator. 2' is its single-acting working piston, and 3' is its piston rod. According to the invention, the internal combustion engine operates with crosshead 4' which acts simultaneously as piston 5' of the charging air pump. The latter could also be built as a double-acting differential piston whereby the lower piston guide serves as crosshead. 6 is the engine crankshaft, and 7 the connecting rod of cylinder 1' which transmits the forces from pistons 1' and 5' to the crankshaft 6. 8 is the upper crankcase part of the engine; 9 is the engine base, in the cylinders of the internal combustion engine, at least one inlet control device 10 each, and at least one exhaust control device 11 each are arranged, said control devices being actuated from the camshaft 12 by means of cams 13, 13' and of the control gear 14, 14'.

In the charging air pump cylinder 15', the charging air is drawn in by the piston 5' through opening 16' and the suction valves 17' and pushed into a receiver 19 which is common for at least part of the internal combustion engine. The engine cylinders 1' as well as its cylinder covers 20' and the charging air pump cylinders 15' may be equipped with water cooling, as shown. They could also be air-cooled instead.

According to this invention, at least one piston type sleeve 21 per engine cylinder is now built into the receiver 19 in front of the inlet control device 10. This sleeve controls the transmission of charging air from receiver 19 to inlet valve 10, and also controls the transmission of secondary air from the above-lying space 22 to said inlet valve 10. Thereby the piston sleeve 21 is so shaped as to have an inner cylindrical guide 23 whose inner diameter is so chosen and so sealed against space 22 that despite the higher pressure of the secondary air in space 22 as against the lower charging air pressure in the receiver 19 the piston sleeve 21, 23 is subjected to approximately equal forces from above and below. For this purpose, a stationary guide 24 whose central cavity may for instance be connected with the atmosphere, is made to extend into the piston sleeve 21, 23 from above. On the outer sleeve part 21 and on the inner sleeve part 23, piston rings 25 and 26 respectively may be built in. The piston sleeves 21 may be actuated by cams as illustrated, e.g. also from the camshaft 12 of the internal combustion engine. For this purpose, a cam and suitable operating gear 27, 28 may be arranged there in well-known fashion.

32 is the exhaust gas conduit to the gas turbine.

Figure 2:
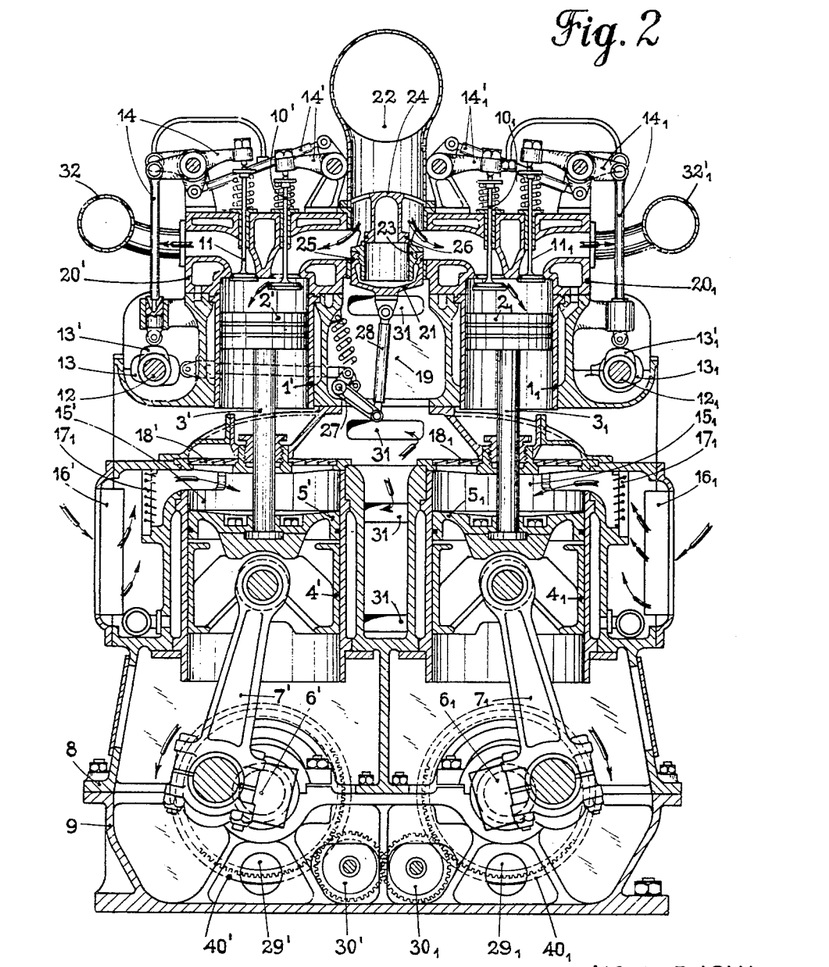
Fig. 2 shows a similar section through a "twin-bank" type of internal combustion engine having two cylinder banks and two crankshafts.

In Fig. 2 which illustrates a vertical section through an internal combustion engine with two cylinder banks arranged side-by-side, the parts of different cylinder banks which are identical or similar to each other are identified by high or low index on their respective numbers. For instance, the engine cylinders are numbered 1' and $1_1$, the pistons 2' and $2_1$, the piston rods 3' and $3_1$, the crosshead guides 4' and $4_1$, the charging air compressor pistons 5' and $5_1$, and so on.

The receiver 19 is arranged between the two cylinder banks. The charging air flows through the valves 18' and $18_1$ into this receiver 19. When the piston sleeve valve 21 is opened, the charging air is led from the receiver 19 up to the inlet valve 10' and $10_1$. The piston sleeve valve 21 is shown to be of similar design as the one on Fig. 1. In Fig. 2, however, the charging air is led from below to the inlet valves 10' and $10_1$ of the two cylinders 1' and $1_1$ by a common sleeve valve 21. This sleeve valve 21 simultaneously controls, with its upper edge, also the admission of the secondary air from the above-lying space 22 to the inlet valves 10' and $10_1$ of both of said cylinders 1' and $1_1$.

The crankshafts 6' and $6_1$ may be coupled through gears, for instance by gear wheel pairs 29', $29_1$, and 30', $30_1$. The two banks of internal combustion cylinders rotate with the same speed, preferably in opposite direction, which is accomplished by suitable gearing as shown in Fig. 2. The cranks of two engine cylinders lying in approximately the same transverse plane to the crankshaft may be so set that said two engine cylinders have simultaneous work phases such as induction, compression, combustion, expansion, etc. The lateral pressures of the cross-heads 4' and $4_1$ of said engine cylinders thus compensate each other with respect to the engine frame 8. With such a design horizontal inertia forces on the engine frame are eliminated. This is very important especially for the installation of such an engine on a vehicle.

Auxiliaries such as cooling water pumps, electrical generators, fans, etc., may be driven advantageously from the shafts of gear wheels 30' to $30_1$. In this case, said shafts are preferably made to rotate at speeds higher than engine crankshaft speed, by suitable choice of their gear wheel diameters.

The charging air which is delivered by crosshead pumps $15'$ and $15_1$ into the receiver 19 may serve not only for charging the engine cylinders $1'$, $1_1$, etc., but also for charging, i.e. to act as a first stage of the secondary air pump. If such secondary air pump is arranged at least on one front end of the internal combustion engine, the charging air may be transmitted from receiver 19 to the secondary air pump through openings 31 in the end face of the engine frame, so that all charging airpiping outside of the engine frame is eliminated.

Figure 3:
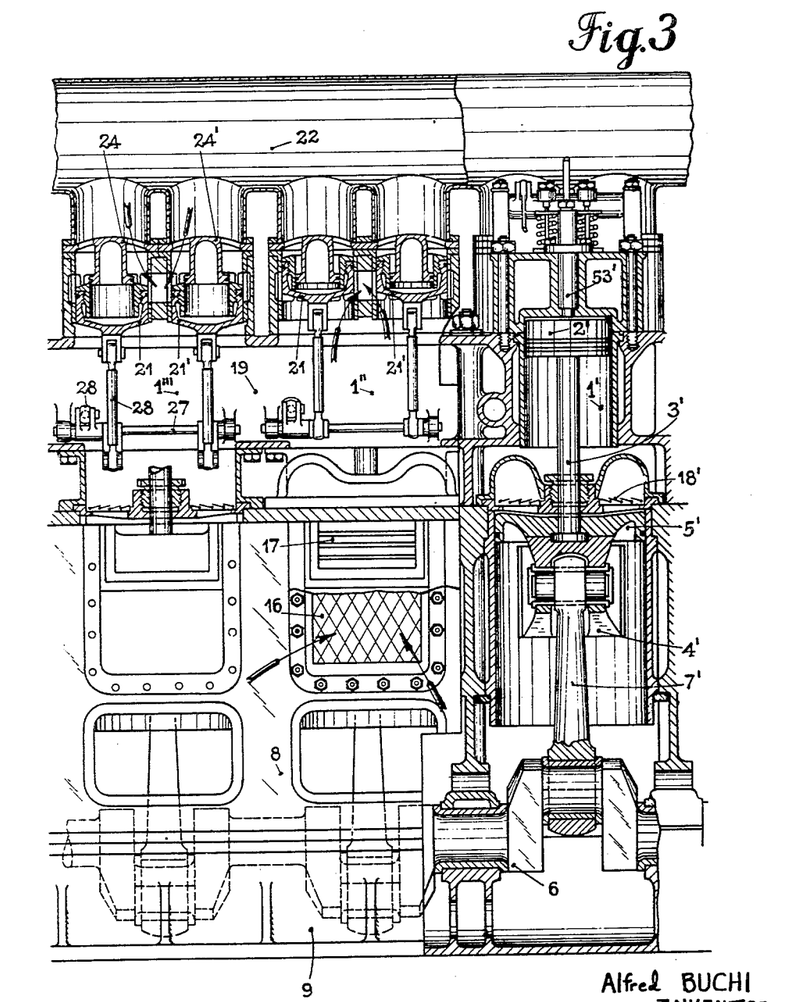
Fig. 3 shows partial vertical sections along the crankshaft axis of the internal combustion engine, and partial side views of same.

In Fig. 3, on the right, is shown a section through cylinder $1'$, the piston $2'$ and the piston rod $3'$ of an engine cylinder. The fuel injection nozzle $53'$, shown here, centrally-located, and the charging air piston $5'$, its crosshead $4'$, the connecting rod $7'$ and the crankshaft 6 are also visible on this section. Beside the sectioned cylinder $1'$, there is a cylinder $1''$ on which a section through the secondary air conduit 22 as well as through piston sleeve valves 21, $21'$, is shown. Two sleeve valves 21 and $21'$ per cylinder, arranged side-by-side in a longitudinal plane through the engine, are shown here.

In case of an engine according to Fig. 2, each of the two piston sleeve valves may serve two engine cylinders $1'$ and $1_1$ which are located in a plane approximately transversal to the crankshafts. Therefore, the two sleeve valves 21 and $21'$ serve two engine cylinders.

The piston sleeve valves 21 and $21'$ of cylinder $1''$ are drawn in a raised position so that the charging air can flow from the receiver 19 below to the inlet valves $10'$ and $10_1$ which are not shown here. The piston sleeve valves 21 and $21'$ for the engine cylinder $1'''$ are shown in a lower position whereby secondary air can flow downward from conduit 22 through guides 24 and $24'$ to the inlet valves $10'$ and $10_1$.

Figure 4:
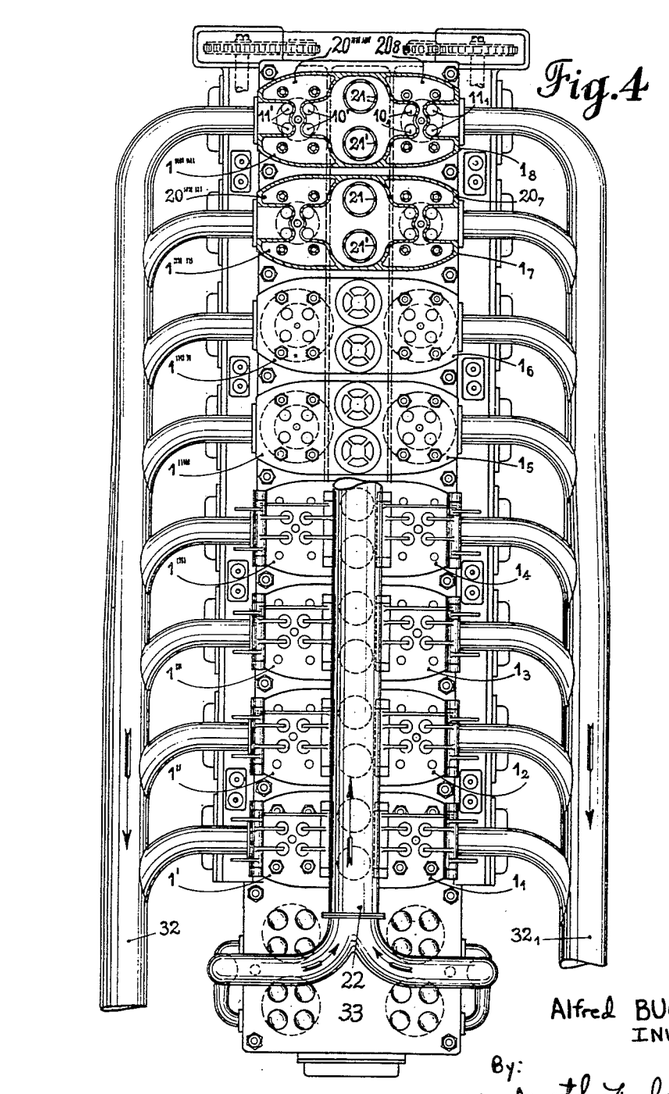
Fig. 4 shows top views of a twin-crankshaft type of a sixteen-cylinder internal combustion engine. It contains also a horizontal section through the cylinder cover region of four engine cylinders.

Fig. 4 shows a top view upon a twin bank gas generator engine with sixteen engine cylinders, arranged in two banks of eight cylinders each, with separate crankshafts for each bank. $1'$, $1''$, $1'''$, $1''''$, $1'''''$, $1''''''$, $1'''''''$, and $1''''''''$ are the cylinders of one bank, and $1_1$, $1_2$, $1_3$, $1_4$, $1_5$, $1_6$, $1_7$ and $1_8$ are the cylinders of the other bank.

A secondary air pump 33 is built on the front end of the internal combustion engine. It consists of at least four cylinders, preferably double-acting, arranged side-by-side in pairs of two, and driven by the crankshaft of at least one engine cylinder bank. Some pump cylinders may also be arranged in tandem above each other. The secondary air pump cylinders obtain their admission air from the receiver 19 of the internal combustion engine through openings 31, as is illustrated in Fig. 2. They discharge the compressed air through conduit 22 to the piston sleeve valves 21 and $21'$. The horizontal sections through the two cylinder covers $20''''''$ —$20_7$ and $20'''''''$ —$20_8$ respectively show the path of the charging air and secondary air through the piston sleeves 21 and $21'$ to the inlet valves $10'$ and $10_1$. Dual inlet valves $10'$ and $10_1$ and dual exhaust valves $11'$ and $11_1$ per engine cylinders are used in this example. The exhaust valves $11'$ and $11_1$ discharge the engine exhaust gases, in this instance, through two exhaust manifolds 32 and $32_1$ to a gas turbine not shown here.

Figure 5:
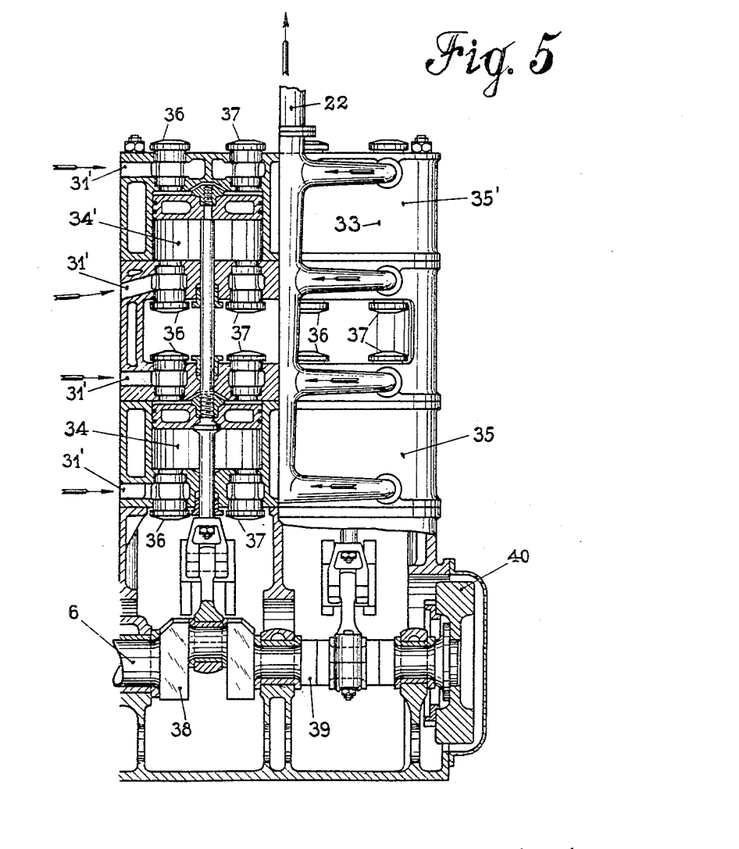
Fig. 5 shows on the left a vertical section, and on the right a side view with partial section through a secondary air pump operating together with the cylinders of the internal combustion engine.

Fig. 5 shows by way of example an embodiment of the secondary air pump 33 on Fig. 4. The extension of at least one crankshaft 6 (Fig. 1) or $6'$ and/or $6_1$ (Fig. 2) drive at least one double-acting tandem air pump 34, $34'$ and/or 35, $35'$.

These air pumps obtain their admission air through openings $31'$ which correspond to the openings 31 in the engine frame (Fig. 2). The admission air is thus precompressed. This air enters through the admission valves 36 to the pump cylinders and is discharged through the discharge valves 37 and conduit 22. The cranks 38 and 39 may preferably be set at a specific angular position with respect to the cranks of the internal combustion cylinders, as will be shown later in Figures 8, 9, 10 for a specific control timing example.

Flywheels 40, $40'$ and $40_1$, respectively, are preferably arranged on the crankshaft 6 (Fig. 1) or the crankshaft 6 (Fig. 1) or the crankshaft $6'$ and $6_1$, (Fig. 2,, Fig. 5) respectively. Such flywheels, as shown in Figs. 1, 2 and 5, permit a most substantial compensation of the tangential forces acting on all the crankshafts 6, $6'$ and $6_1$. Thus there are only small tangential forces to be compensated between the two crankshafts, by transmission through gearing $29'$ $29_1$, $30'$ and $30_1$ (Fig. 2).

Figures 6, 7:
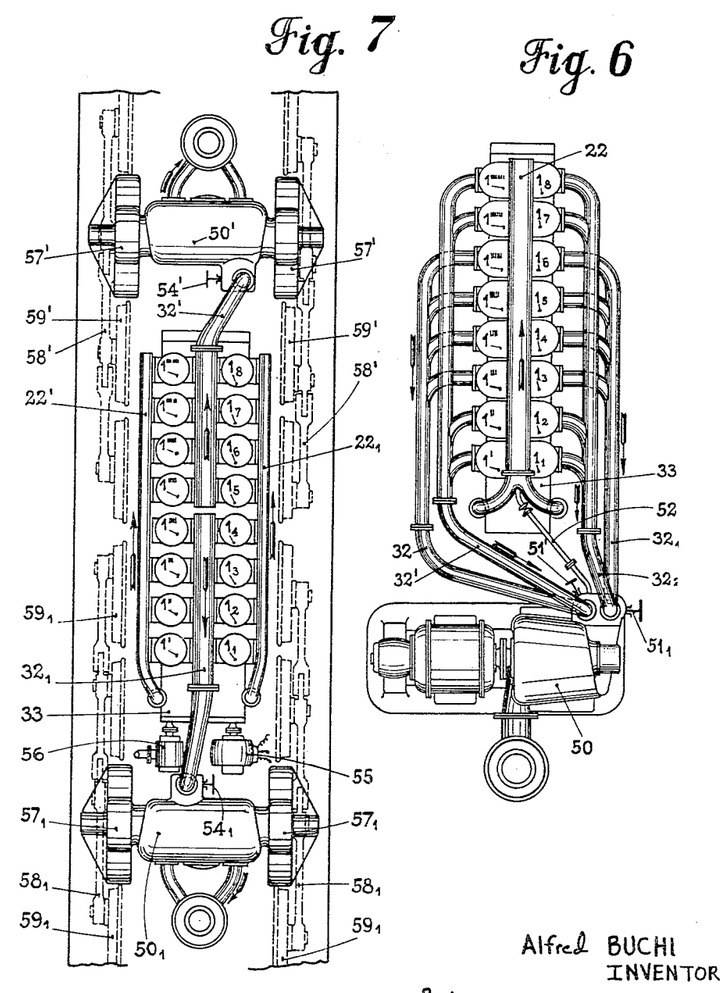

Fig. 6 shows schematically a top view of a gas turbine plant with a gas generator according to this invention. The gas generator is designed here as a twin-crankshaft engine with $2\times 8$ cylinders, $1_1$-$1_8$ and $1'$-$1''''''''$, respectively. The secondary air is fed to this engine from the twin-crank-shaft pump 33. The exhaust gases of the combustion gas generator leave the latter through four exhaust pipes 32, $32'$ and $32_1$, $32_2$ respectively, which collect the exhausts from four engine cylinders each and transmit same to the gas turbine 50. The gas turbine is equipped with a control device $51'$, $51_1$, shown here only schematically. Secondary air from the conduit 22 can also be delivered, through pipe 52, directly to said control device, e.g. for overload purposes.

Fig. 7 shows a gas turbine plant for a locomotive with direct drive. The driving wheels $59'$ and $59_1$ are driven through rods $58'$ and $58_1$ and through gears $57'$ and $57_1$ from two gas turbines $50'$ and $50_1$. A combustion gas generator with $2\times 8$ cylinders is again shown, with cylinders $1_1$-$1_8$ and $1'$-$1''''''''$. The eight cylinders of each bank discharge thin exhaust gases through pipes $32'$ and $32_1$, respectively, to one of the two gas turbines $50'$ and $50_1$. At least one of the latter is built as a forward-turbine as well as an astern-turbine so that the locomotive can reverse its motion by a simple change of admission to the gas turbine. The gas turbines actuate the driving wheels $59'$ and $59_1$ of the vehicle via gears $57'$ and $57_1$ and driving rods $58'$ and $58_1$. By means of controlling devices $54'$ and $54_1$, the gas admission to the turbines can be set for ahead drive or astern drive, and it may also be regulated if desired.

Fig. 7 shows, in addition, a possible arrangement for driving some auxiliaries, such as electrical generators 55, water pumps 56, etc. from the internal combustion engine.

Figure 8:
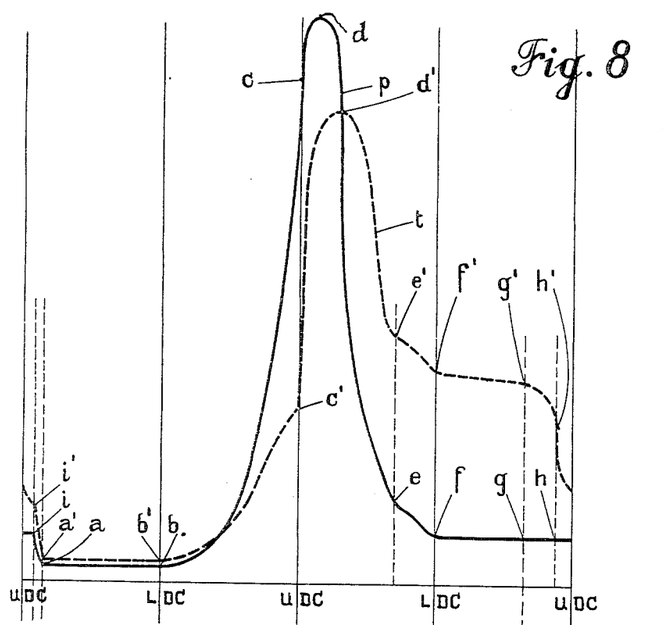
Figs. 8, 9 and 10 show, in diagram form, the control timing sequence and approximate timing of engine cylinder pressures and temperatures, of the pressures in charging air pumps and in secondary air pumps, in function of the crank angle position of one piston of an internal combustion engine according to this invention.

Fig. 8, $p$ is the pressure diagram in a cylinder of an internal combustion engine according to this invention. $t$ is the corresponding temperature diagram for the air and exhaust, respectively. The upper dead center positions of the respective engine piston are marked UDC; the lower dead center positions are marked LDC.

The important points of the pressure diagram are marked $a$, $b$, $c$, $d$, $e$, $f$, $g$, $h$, $i$; those of the temperature diagram are marked $a'$-$i'$. Lines $a$—$b$ and $a'$—$b'$ correspond to the admission of charging air to the cylinders. Lines $b$—$c$ and $b'$—$c'$ represent the pressures or temperatures, respectively, during compression stroke. Lines $c$—$d$—$e$ and $c'$—$d'$—$e'$ refer to the combustion and expansion. $e$ and $e'$ represent the pressure and temperature conditions at the start of the exhaust phase, which latter has progressed to point $f$ and $f'$ at the end of the expansion stroke at LDC. Subsequently, the exhaust gases are pushed out of the cylinder by the piston and are transmitted to the gas turbine. According to the invention, exhaust gases alone may flow to the turbine at first, and only after point $g$ ($g'$) the corresponding cylinder is fed with secondary air of sufficient quantity to effect a relatively gradual cooling of the cylinder contents. The thus created mixture of gas and air then enters the gas turbine, too, with decreasing (i.e. lower) temperature than the previously-exhausted unmixed gases. Therefore, less energy per weight unit of gas is transmitted to the turbine during the phase $g$—$h$. After point $h$ ($h'$), a sufficient amount of secondary air is introduced up to point $i$ to effect at least near perfect scavenging of the engine cylinder space—which is small at UDC—from the remaining exhaust gases. This scavenging is preferably effected by an air quantity equalling several times the cylinder space to be scavenged, to accomplish also a cooling of the cylinder and piston walls as well as of the valves. After complete scavenging, the cylinder space is filled with relatively cold secondary air only, and with no more exhaust gases. If the secondary air is cooled prior to its admission to the cylinder, a relatively low temperature of the cylinder charge can thus be obtained. After completion of the scavenging phase there may be, according to this invention, an expansion of the already relatively cold cylinder charge to the lower charging pressure level, along line $i$—$a$, with a corresponding temperature drop illustrated by line $i'$—$a'$. This effects a further substantial temperature reduction, so that the charging air which enters at "$a$" is not, or not much, heated by the secondary air already present in the cylinder. Otherwise, the charging air weight admitted to the cylinder would be reduced, and the output of the internal combustion engine and of the gas turbine, with given process temperatures, would be smaller.

Figure 9:
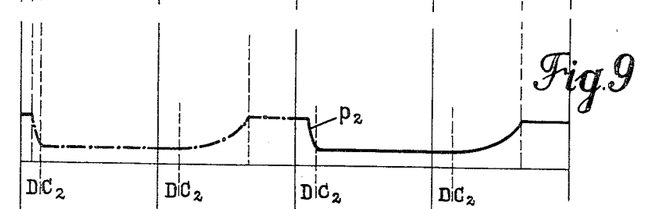

In the pressure diagram of the secondary air pump, in Fig. 9, the pressures $p_2$ in one of its cylinders are shown. In order to cool and scavenge the combustion engine cylinders in the manner illustrated in Fig. 8 and described above, the cooling- and scavenging-air must be transmitted from the secondary air pump from $g$ via $h$ to $i$ to the combustion engine cylinders with the necessary pressure. The inlet and exhaust valves of the engine cylinders must also be opened simultaneously up to the end of the scavenging period. In order to insure obtaining the necessary pressure of the secondary air at the proper moment, the crank or cranks of the proper secondary air pumps may be, according to this invention, so set in relation to the crank or cranks of the corresponding combustion engine pistons that the secondary air is delivered during the cooling- and scavenging-period of the combustion cylinder. This is illustrated in Fig. 9 by the different setting of the engine dead centers UDC and LDC as compared to the dead center $DC_2$ of the secondary air pump.

Figure 10:
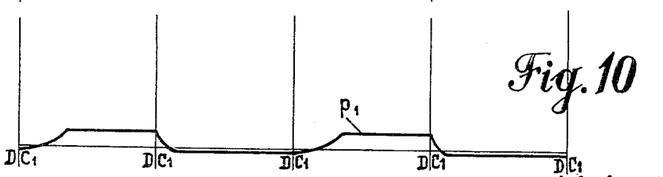

In Fig. 10, the pressure sequence $p_1$ is shown in the charging air pumps whose pistons move synchronously with the combustion engine pistons, e.g. which have simultaneous dead center positions with the latter. Since the secondary air pump pistons move out of phase to the combustion engine pistons, lagging behind the latter, the object of the invention has the further advantage of having charging air pumps start their delivery at about the moment when the secondary air pressure in the engine cylinders has expanded to approximately charging air pressure level. In any case, the charging air pump is delivering air at full rate when the engine piston is moving through the middle of its stroke and this draws in charging air at maximum rate.

An operating scheme according to diagram Figures 8 to 10 may, of course, also be applied to internal combustion engines of a type different from the one illustrated in this application.

It has the great advantage of permitting the exhaust gases to enter the turbine with high temperature, with high energy. The time interval during which the exhaust gases are cooled by the secondary air, and during which relatively cold secondary air enters the gas turbine as scavenging air, is relatively short. It is suitably chosen to just suffice for good cooling and scavenging of the combustion cylinders and for the cooling of the gas turbine.

I claim:

1. A gas generator plant built as a four-cycle supercharged internal combustion engine having a row of cylinders in line with inlet and outlet valves, a crankshaft for said row of cylinders, said engine delivering a pressure medium as the sole output of energy to a gas turbine, comprising a first air compressor delivering charging air to said cylinders, a secondary air compressor delivering secondary air of higher pressure than that of the charging air for cooling and scavenging said cylinders, a control device for each cylinder of said engine connected to the inlet valve opening thereof, said control device controlling both said charging air and said secondary air, timing means for said inlet and outlet valves and said control device, an extension upon said crank-shaft for driving said secondary air compressor, cranks upon said engine crank-shaft, cranks for said extension angularly off-set in relation to the cranks of the co-operating engine cylinders to operatively lag in phase with respect to the cranks of said co-operating engine cylinders at such crank angle that the highest pressure of said secondary air is created during said cooling and scavenging phase.

2. A gas generator plant for delivering a pressure medium as the sole output of energy, comprising an arrangement of a four-stroke internal combustion engine, two piston cylinder banks having pairs of laterally adjacent cylinders with timing means, two crankshafts, a first air compressor delivering charging air, a secondary air compressor delivering secondary air at a higher pressure than said charging air, control means for the supply of charging air and secondary air, said timing and control means for each pair of laterally adjacent cylinders being set to create synchronous working cycles therein, said control means comprising a control device between each pair of cylinders, one and the same control device governing the flow of charging air and secondary air to said pair of cylinders and being actuated by linkage operated by the same timing means which actuates the inlet and exhaust valve of said engine cylinder pairs, extensions of the two crank-shafts of the engine driving, said secondary air compressor cranks for said engine crankshafts, cranks for said extensions for said secondary compressor, the cranks of the secondary compressor on the extensions of the engine crankshafts being angularly offset in relation to the cranks of the co-operating engine cylinders to operatively lag in phase with respect to the cranks of said co-operating engine cylinders at such crank angle that the highest pressure of said secondary air is created during said cooling and scavenging phase.

3. A gas generator plant built as a four-cycle supercharged internal combustion engine having a row of cylinders in line with inlet and outlet valves, a crankshaft for said row of cylinders, said engine delivering a pressure medium as the sole output of energy to a gas turbine, comprising a first air compressor delivering charging air to said cylinders, a secondary air compressor delivering secondary air of higher pressure than that of the charging air for cooling and scavenging said cylinders, a control device for each cylinder of said engine connected to the inlet valve opening thereof, said control device controlling conduits for the charging air and the secondary air, said conduits being connected to said control device, said control device comprising a cylindrical connecting piece for said conduits to be connected at opposed ends thereof and having a tap-off connecting to the inlet valve opening of an engine cylinder, said connecting piece comprising a movable piston sleeve to connect said conduits at predetermined periods with said tap-off connection to said inlet valve opening, timing means for said inlet and outlet valves and said control device, an extension upon said crankshaft for driving said secondary air compressor, cranks upon said engine crank-shaft, cranks for said extension angularly off-set in relation to the cranks of the co-operating engine cylinders to operatively lag in phase with respect to the cranks of said co-operating engine cylinders at such crank angle that the highest pressure of said secondary air is created during said cooling and scavenging phase.

4. A gas generator plant for delivering a pressure medium as the sole output of energy, comprising an arrangement of a 4-stroke internal combustion engine, two piston cylinder banks having pairs of laterally adjacent cylinders with timing means, two crankshafts, a first air compressor delivering charging air, a secondary air compressor delivering secondary air at a higher pressure than said charging air, control means for the supply of charging air and secondary air, said timing and control means for each pair of laterally adjacent cylinders being set to create synchronous working cycles therein, said control means comprising a control device between each pair of cylinders, one and the same control device governing the flow of charging air and secondary air to each pair of cylinders and being actuated by linkage operated by the same timing means which actuates the inlet and exhaust valve of said engine cylinder pairs, two conduits one for the charging air and the other for the secondary air, said conduits being connected to said control device, said control device comprising a cylindrical connecting piece, said conduits being connected at opposed ends of said connecting piece, the latter having two tap-off connections to the inlet valve openings of each pair of engine cylinders, said connecting piece comprising a movable piston sleeve to supply the air of one or the other of said conduits at predetermined periods with said tap-off connection leading to said inlet valve opening.

5. A gas generator plant built as a four-cycle supercharged internal combustion engine having a row of cylinders in line with inlet and outlet valves, a crank-shaft for said row of cylinders, said engine delivering a pressure medium as the sole output of energy to a gas turbine, comprising a first air compressor delivering charging air to said cylinders, a secondary air compressor delivering secondary air of higher pressure than that of the charging air for cooling and scavenging said cylinders, a control device for each cylinder of said engine connected to the inlet valve opening thereof, said control device controlling conduits for the charging air and the secondary air, said conduits being connected to said control device, said control device comprising a cylindrical connecting piece for said conduits to be connected at opposed ends thereof and having a tap-off connecting to the inlet valve opening of an engine cylinder, said connecting piece comprising a movable piston sleeve to connect said conduits at predetermined periods with said tap-off connection to said inlet valve opening, timing means for said inlet and outlet valves and said control device, an extension upon said crank-shaft for driving said secondary air compressor, cranks upon said engine crank-shaft, cranks for said extension angularly off-set in relation to the cranks of the co-operating engine cylinders to operatively lag in phase with respect to the cranks of said co-operating engine cylinders at such crank angle that the highest pressure of said secondary air is created during said cooling and scavenging phase, said connecting piece having a guide member secured within said connecting piece forming an annular space, the cross-sectional area of said annular space with respect to the cross-section of said piston sleeve being dimensioned so that the pressure force of the charging air and the pressure force of the secondary air upon opposed ends of said piston sleeve are made substantially equal.

6. A gas generator plant for delivering a pressure medium as the sole output of energy, comprising an arrangement of a 4-stroke internal combustion engine, two piston cylinder banks having pairs of laterally adjacent cylinders with timing means, two crankshafts, a first air compressor delivering charging air, a secondary air compressor delivering secondary air at a higher pressure than said charging air, control means for the supply of charging air and secondary air, said timing and control means for each pair of laterally adjacent cylinders being set to create synchronous working cycles therein, said control means comprising a control device between each pair of cylinders, one and the same control device governing the flow of charging air and secondary air to each pair of cylinders and being actuated by linkage operated by the same timing means which actuates the inlet and exhaust valve of said engine cylinder pairs, two conduits one for the charging air and the other for the secondary air, said conduits being connected to said control device, said control device comprising a cylindrical connecting piece, said conduits being connected at opposed ends of said connecting piece, the latter having two tap-off connections to the inlet valve openings of each pair of engine cylinders, said connecting piece comprising a movable piston sleeve to supply the air of one or the other of said conduits at predetermined periods with said tap-off connection leading to said inlet valve opening, said connecting piece having a guide member secured within said connecting piece forming an annular space, the cross-sectional area of said annular space with respect to the cross-section of said piston sleeve being dimensioned so that the pressure force of the charging air and the pressure force of the secondary air upon opposed ends of said piston sleeve are made substantially equal.

7. A gas generator plant according to claim 5 wherein said control device is actuated by said timing means.

8. A gas generator plant built as a four-cycle supercharged internal combustion engine having a row of cylinders in line with inlet and outlet valves, a crank-shaft for said row of cylinders, said engine delivering a pressure medium as the sole output of energy to a gas turbine, comprising a first air compressor delivering charging air to said cylinders, a secondary air compressor delivering secondary air of higher pressure than that of the charging air for cooling and scavenging said cylinders, a control device for each cylinder of said engine connected to the inlet valve opening thereof, said control device controlling both said charging air and said secondary air, timing means for said inlet and outlet valves and said control device, an extension upon said crank-shaft for driving said secondary air compressor, cranks upon said engine crank-shaft, cranks for said extension angularly off-set in relation to the cranks of the co-operating engine cylinders to operatively lag in phase with respect to the cranks of said co-operating engine cylinders at such crank angle that the highest pressure of said secondary air is created during said cooling and scavenging phase, said secondary air compressor being a double-acting air piston compressor connected at its suction side directly to an air receiver for the charging air formed by the walls of the engine frame.

9. A gas generator plant for delivering a pressure medium as the sole output of energy, comprising an arrangement of a four-stroke internal combustion engine, two piston cylinder banks having pairs of laterally adjacent cylinders with timing means, two crankshafts, a first air compressor delivering charging air, a secondary air compressor delivering secondary air at a higher pressure than said charging air, control means for the supply of charging air and secondary air, said timing and control means for each pair of laterally adjacent cylinders being set to create synchronous working cycles therein, said control means comprising a control device between each pair of cylinders, one and the same control device governing the flow of charging air and secondary air to said pair of cylinders and being actuated by linkage operated by the same timing means which actuates the inlet and exhaust valve of said engine cylinder pairs, extensions of the two crank-shafts of the engine driving said secondary air compressor cranks for said engine crank-shafts, cranks for said extensions for said secondary compressor, the cranks of the secondary compressor on the extensions of the engine crankshafts being angularly off-set in relation to the cranks of the co-operating engine cylinders to operatively lag in phase with respect to the cranks of said co-operating engine cylinders at such crank angle that the highest pressure of said secondary air is created during said cooling and scavenging phase, said secondary air compressor being a double-acting air piston compressor connected at its suction side directly to an air receiver for the charging air formed by the walls of the engine frame.

10. A gas generator plant built as a four-cycle supercharged internal combustion engine having a row of cylinders in line with inlet and outlet valves, a crankshaft for said row of cylinders, said engine delivering a pressure medium as the sole output of energy to a gas turbine, comprising a first air compressor delivering charging air to said cylinders, a secondary air compressor delivering secondary air of higher pressure than that of the charging air for cooling and scavenging said cylinders, a control device for each cylinder of said engine connected to the inlet valve opening thereof, said control device controlling conduits for the charging air and the secondary air, said conduits being connected to said control device, said control device comprising a cylindrical connecting piece for said conduits to be connected at opposed ends thereof and having a tap-off connecting to the inlet valve opening of an engine cylinder, said connecting piece comprising a movable piston sleeve to connect said conduits at predetermined periods with said tap-off connection to said inlet valve opening, timing means for said inlet and outlet valves and said control device, an extension upon said crankshaft for driving said secondary air compressor, cranks upon said engine crank-shaft, cranks for said extension angularly off-set in relation to the cranks of the co-operating engine cylinders to operatively lag in phase with respect to the cranks of said co-operating engine cylinders at such crank angle that the highest pressure of said secondary air is created during said cooling and scavenging phase, said secondary air compressor being a double-acting air piston compressor connected at its suction side directly to an air receiver for the charging air formed by the walls of the engine frame.

11. A gas generator plant for delivering a pressure medium as the sole output of energy, comprising an arrangement of a 4-stroke internal combustion engine, two piston cylinder banks having pairs of laterally adjacent cylinders with timing means, two crankshafts, a first air compressor delivering charging air, a secondary air compressor delivering secondary air at a higher pressure than said charging air, control means for the supply of charging air and secondary air, said timing and control means for each pair of laterally adjacent cylinders being set to create synchronous working cycles therein, said control means comprising a control device between each pair of cylinders, one and the same control device governing the flow of charging air and secondary air to each pair of cylinders and being actuated by linkage operated by the same timing means which actuates the inlet and exhaust valve of said engine cylinder pairs, two conduits one for the charging air and the other for the secondary air, said conduits being connected to said control device, said control device comprising a cylindrical connecting piece, said conduits being connected at opposed ends of said connecting piece, the latter having two tap-off connections to the inlet valve openings of each pair of engine cylinders, said connecting piece comprising a movable piston sleeve to supply the air of one or the other of said conduits at predetermined periods with said tap-off connection leading to said inlet valve opening, said secondary air compressor being a double-acting air piston compressor connected at its suction side directly to an air receiver for the charging air formed by the walls of the engine frame.

12. A gas generator plant built as a four-cycle supercharged internal combustion engine having a row of cylinders in line with inlet and outlet valves, a crank-shaft for said row of cylinders, said engine delivering a pressure medium as the sole output of energy to a gas turbine, comprising a first air compressor delivering charging air to said cylinders, a secondary air compressor delivering secondary air of higher pressure than that of the charging air for cooling and scavenging said cylinders, a control device for each cylinder of said engine connected to the inlet valve opening thereof, said control device controlling conduits for the charging air and the secondary air, said conduits being connected to said control device, said control device comprising a cylindrical connecting piece for said conduits to be connected at opposed ends thereof and having a tap-off connecting to the inlet valve opening of an engine cylinder, said connecting piece comprising a movable piston sleeve to connect said conduits at predetermined periods with said tap-off connection to said inlet valve opening, timing means for said inlet and outlet valves and said control device, an extension upon said crankshaft for driving said secondary air compressor, cranks upon said engine crankshaft, cranks for said extension angularly off-set in relation to the cranks of the co-operating engine cylinders to operatively lag in phase with respect to the cranks of said co-operating engine cylinders at such crank angle that the highest pressure of said secondary air is created during said cooling and scavenging phase, said connecting piece having a guide member secured within said connecting piece forming an annular space, the cross-sectional area of said annular space with respect to the cross-section of said piston sleeve being dimensioned so that the pressure force of the charging air and the pressure force of the secondary air upon opposed ends of said piston sleeve are made substantially equal, said secondary air compressor being a double-acting air piston compressor connected at its suction side directly to an air receiver for the charging air formed by the walls of the engine frame.

13. A gas generator plant for delivering a pressure medium as the sole output of energy, comprising an arrangement of a 4-stroke internal combustion engine, two piston cylinder banks having pairs of laterally adjacent cylinders with timing means, two crankshafts, a first air compressor delivering charging air, a secondary air compressor delivering secondary air at a higher pressure than said charging air, control means for the supply of charging air and secondary air, said timing and control means for each pair of laterally adjacent cylinders being set to create synchronous working cycles therein, said control means comprising a control device between each pair of cylinders, one and the same control device governing the flow of charging air and secondary air to each pair of cylinders and being actuated by linkage operated by the same timing means which actuates the inlet and exhaust valve of said engine cylinder pairs, two conduits one for the charging air and the other for the secondary air, said conduits being connected to said control device, said control device comprising a cylindrical connecting piece, said conduits being connected at opposed ends of said connecting piece, the latter having two tap-off connections to the inlet valve openings of each pair of engine cylinders, said connecting piece comprising a movable piston sleeve to supply the air of one or the other of said conduits at predetermined periods with said tap-off connection leading to said inlet valve opening, said connecting piece having a guide member secured within said connecting piece forming an annular space, the cross-sectional area of said annular space with respect to the cross-section of said piston sleeve being dimensioned so that the pressure force of the charging air and the pressure force of the secondary air upon opposed ends of said piston sleeve are made substantially equal, said secondary air compressor being a double-acting air piston compressor connected at its suction side directly to an air receiver for the charging air formed by the walls of the engine frame.

14. A gas generator plant for delivering a pressure medium as the sole output of energy, comprising an arrangement of a 4-stroke internal combustion engine, two piston cylinder banks having pairs of laterally adjacent cylinders with timing means, two crankshafts, a first air compressor delivering charging air, a secondary air compressor delivering secondary air at a higher pressure than said charging air, control means for the supply of charging air and secondary air, said timing and control means for each pair of laterally adjacent cylinders being set to create synchronous working cycles therein, said control means comprising a control device between each pair of cylinders, one and the same control device governing the flow of charging air and secondary air to each pair of cylinders and being actuated by linkage operated by the same timing means which actuates the inlet and exhaust valve of said engine cylinder pairs.

15. A gas generator plant for delivering a pressure medium as the sole output of energy, comprising an arrangement of a 4-stroke internal combustion engine, two piston cylinder banks having pairs of laterally adjacent cylinders with timing means, two crankshafts, a first air compressor delivering charging air, a secondary air compressor delivering secondary air at a higher pressure than said charging air, control means for the supply of charging air and secondary air, said timing and control means for each pair of laterally adjacent cylinders being set to creat synchronous working cycles therein, said control means comprising a control device between each pair of cylinders, one and the same control device governing the flow of charging air and secondary air to each pair of cylinders and being actuated by linkage operated by the same timing means which actuates the inlet and exhaust valve of said engine cylinder pairs, said secondary air compressor being a double-acting air piston compressor connected at its suction side directly to an air receiver for the charging air formed by the walls of the engine frame.

16. A gas generator plant for delivering a pressure medium as the sole output of energy, comprising an arrangement of a 4-stroke internal combustion engine, two piston cylinder banks having pairs of laterally adjacent cylinders with timing means, two crankshafts, a first air compressor delivering secondary air at a higher pressure than said charging air, control means for the supply of charging air and secondary air, said timing and control means for each pair of laterally adjacent cylinders being set to create synchronous working cycles therein, said control means comprising a control device between each pair of cylinders, one and the same control device governing the flow of charging air and secondary air to each pair of cylinders and being actuated by linkage operated by the same timing means which actuates the inlet and exhaust valve of said engine cylinder pairs, and a valve for two cylinders arranged side-by-side in an approximately transverse plane to the engine shaft, said valve governing the flow of charging air and of secondary air to said engine cylinders.

17. A gas generator plant for delivering a pressure medium as the sole output of energy, comprising an arrangement of a 4-stroke internal combustion engine, two piston cylinder banks having pairs of laterally adjacent cylinders with timing means, two crankshafts, a first air compressor delivering charging air, a secondary air compressor delivering secondary air at a higher pressure than said charging air, control means for the supply of charging air and secondary air, said timing and control means for each pair of laterally adjacent cylinders being set to create synchronous working cycles therein, said control means comprising a control device between each pair of cylinders, one and the same control device governing the flow of charging air and secondary air to each pair of cylinders and being actuated by linkage operated by the same timing means which actuates the inlet and exhaust valve of said engine cylinder pairs, ducts common for said banks for the admission of charging and secondary air arranged along the middle between the same, and separate conduits outside of the combustion engine cylinders for the discharge of exhaust gases.

18. A supercharged four-stroke cycle internal combustion engine gas generator according to claim 14 wherein a secondary air compressor is arranged at each end of the combustion engine, and both compressors deliver to one receiver of the combustion engine.

References Cited in the file of this patent

UNITED STATES PATENTS

| | | |
|---|---|---|
| 759,093 | Gardner | May 3, 1904 |
| 1,436,434 | Conners | Nov. 21, 1922 |
| 1,620,565 | McKeown | Mar. 8, 1927 |
| 1,741,730 | Newton | Dec. 31, 1929 |
| 2,117,700 | Burkhardt | May 17, 1938 |
| 2,155,068 | Walti | Apr. 18, 1939 |
| 2,283,606 | Lewis | May 19, 1942 |